United States Patent [19]

Imanishi

[11] Patent Number: 5,014,129
[45] Date of Patent: May 7, 1991

[54] VIDEO SIGNAL PROCESSING APPARATUS FOR CONVERTING COMPOSITE IMAGE INPUT SIGNALS INTO OUTPUT SIGNALS HAVING INCREASED SCAN LINES

[75] Inventor: Yasuo Imanishi, Hino, Japan
[73] Assignee: Yokogawa Medical Systems, Limited, Tokyo, Japan
[21] Appl. No.: 415,276
[22] PCT Filed: Mar. 30, 1988
[86] PCT No.: PCT/JP88/00326
 § 371 Date: Sep. 21, 1989
 § 102(e) Date: Sep. 21, 1989
[87] PCT Pub. No.: WO88/07726
 PCT Pub. Date: Oct. 6, 1988
[30] Foreign Application Priority Data
Mar. 31, 1987 [JP] Japan .................................. 62-78402
[51] Int. Cl.$^5$ .............................................. H04N 5/14
[52] U.S. Cl. .................................... 358/166; 358/447; 358/455; 382/54; 340/793
[58] Field of Search ................ 358/166, 160, 140, 428, 358/429, 447, 455, 183; 340/793; 382/54

[56] References Cited

U.S. PATENT DOCUMENTS 4,251,837 2/1981 Janeway, III ....................... 358/455
4,924,521 5/1990 Dinan et al. ...................... 358/133 X

FOREIGN PATENT DOCUMENTS 48-17636 3/1973 Japan .
53-15774 5/1978 Japan .
56-149674 11/1981 Japan .

Primary Examiner—Victor R. Kostak
Attorney, Agent, or Firm—Moonray Kojima

[57] ABSTRACT

A video signal processing apparatus for converting an input analog video signal, including a variable-density image signal and a two-state image signal, into an output analog video signal whose number of scanning lines is increased without degrading the visibility of the two-state image; wherein the input video signal is separated into variable-density image data and two-state image data; then, a portion of the variable-density image data from which the two-state image data is removed, is replaced with a variable-density image data portion immediately before the beginning of the two-state image data; then, the variable-density image data and the two-state image data are stored separately in a memory; then, a general analog-mode enlarge interpolation processing, such as a linear interpolation processing, is performed on the variable-density image data; then, a two-state mode enlarge interpolation processing is performed 10 on the two-state image data; and then, the variable-density image data and the two-state image data, both of which are enlarge interpolated, are recombined.

4 Claims, 3 Drawing Sheets

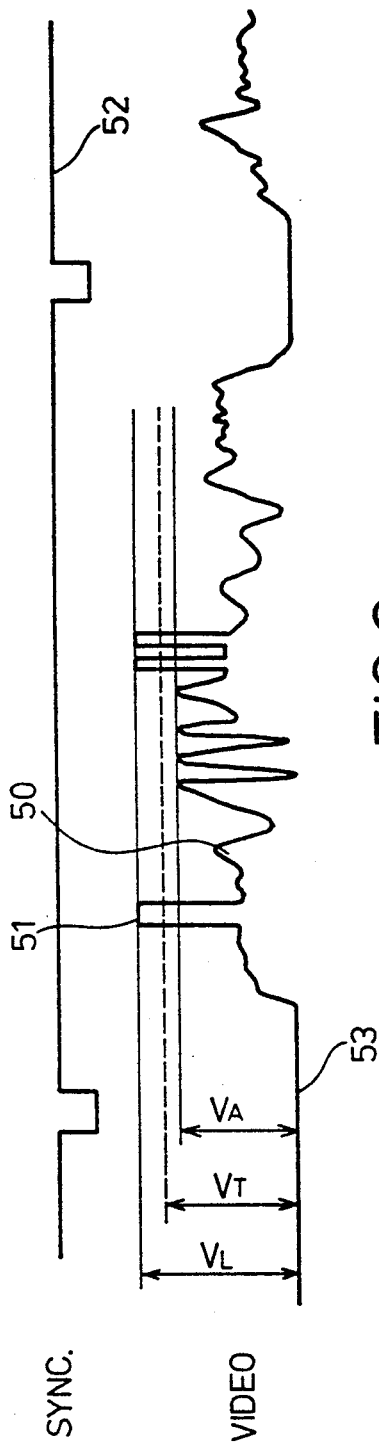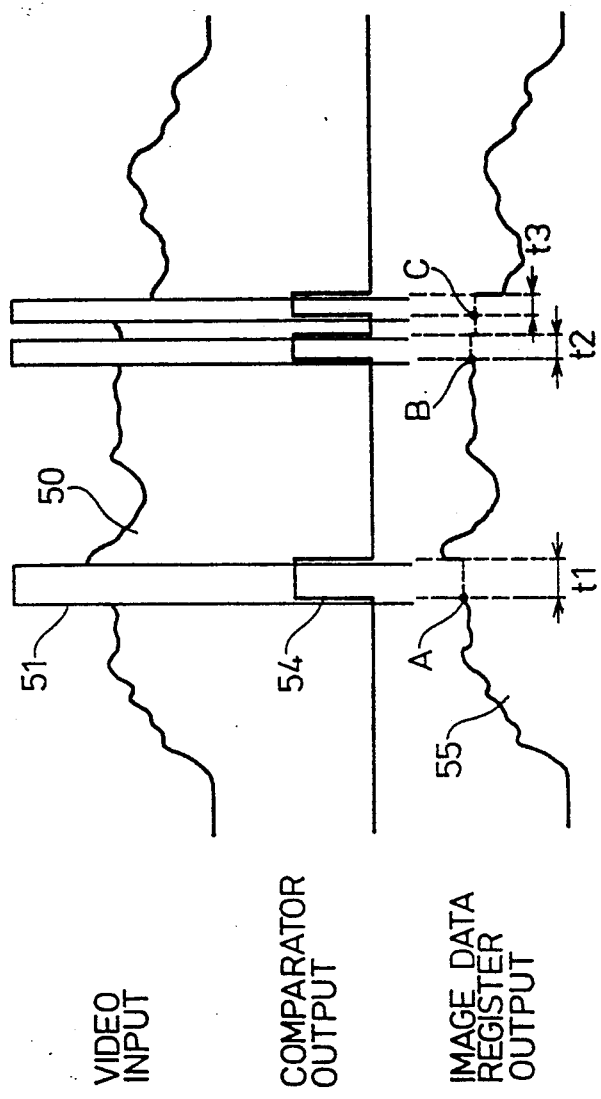

VIDEO SIGNAL PROCESSING APPARATUS FOR CONVERTING COMPOSITE IMAGE INPUT SIGNALS INTO OUTPUT SIGNALS HAVING INCREASED SCAN LINES

TECHNICAL FIELD

This invention relates to a video signal processing apparatus for converting an input analog video signal including a variable-density image signal and a two-state image signal into an output analog video signal with the number of scanning lines increased.

BACKGROUND ART

When displaying an image represented by an input analog video signal by the use of a cathode ray tube (hereinafter referred to as a CRT) or the like having a large number of scanning lines in an enlarged or high-definition mode, generally, the input video signal is converted by an A-D converter into a digital signal, the digital data corresponding to one frame is stored in a first frame memory, the data held in this frame memory is converted by an enlarge interpolator into an enlarged image data signal and written in a second frame memory, and then the image data held in this second frame memory is successively read out and converted by a D-A converter into an analog signal, this analog signal output being used in displaying the original image in the enlarged or high-definition mode. When converting the original image data made up of 512×512 pixels into the enlarged image data made up of 1024×1024 pixels, the enlarge interpolator is designed to interpolate, between adjacent original pixels, a new pixel having such an intensity level as to linearly interpolate the intensity levels of these adjacent original pixels.

However, if such an interpolation processing is adopted in handling the image data on which a so-called two-state image is overlaid, for example, a variable-density image on which another image of character, graphic symbol, cursor, etc. is displayed in superposed form, the interpolation processing is performed in the surroundings of each overlay pixel, or between the overlay pixel having a high intensity level and each pixel of the variable-density image generally having a lower intensity level than the former; as a result, a new pixel having an intermediate intensity level between them is interpolated. Therefore, if the thus interpolated enlarged image data is displayed, the surroundings of the overlay image grow dim, spoiling the sharpness of a display of character, graphic symbol, cursor, etc.

DISCLOSURE OF THE INVENTION

It is an object of the present invention to provide a video signal processing apparatus for converting an input analog video signal including a variable-density image signal and a two-state image signal into an output video signal with the number of scanning lines increased without spoiling the visibility of a two-state image display.

In brief, the present invention processes an input video signal by; separating the input video signal into variable-density image data and two-state image data, replacing a portion of the variable-density image data from which the two-state image data is removed with a variable-density image data portion immediately before the beginning of the two-state image data, storing the variable-density image data and the two-state image data separately in memory means, performing a general analog-mode enlarge interpolation processing such as a linear interpolation processing on the variable-density image data, performing a two-state-mode enlarge interpolation processing on the two-state image data, and re-combining the variable-density image data and the two-state image data both enlarge-interpolated.

BRIEF DESCRIPTION OF THE DRAWINGS

FIG. 2 is a diagram showing exemplary input analog video signal and composite synchronizing signal;

FIG. 3 is a diagram showing the relationship between the input analog video signal, and two-state image data and variable-density image data separated from the former;

FIGS. 4A and 4B are diagrams explanatory of an enlarge interpolation processing for the variable-density image data; and FIGS. 5A and 5B are diagrams explanatory of another enlarge interpolation processing for the two-state image data.

BEST MODE FOR CARRYING OUT THE INVENTION

Figure 1:
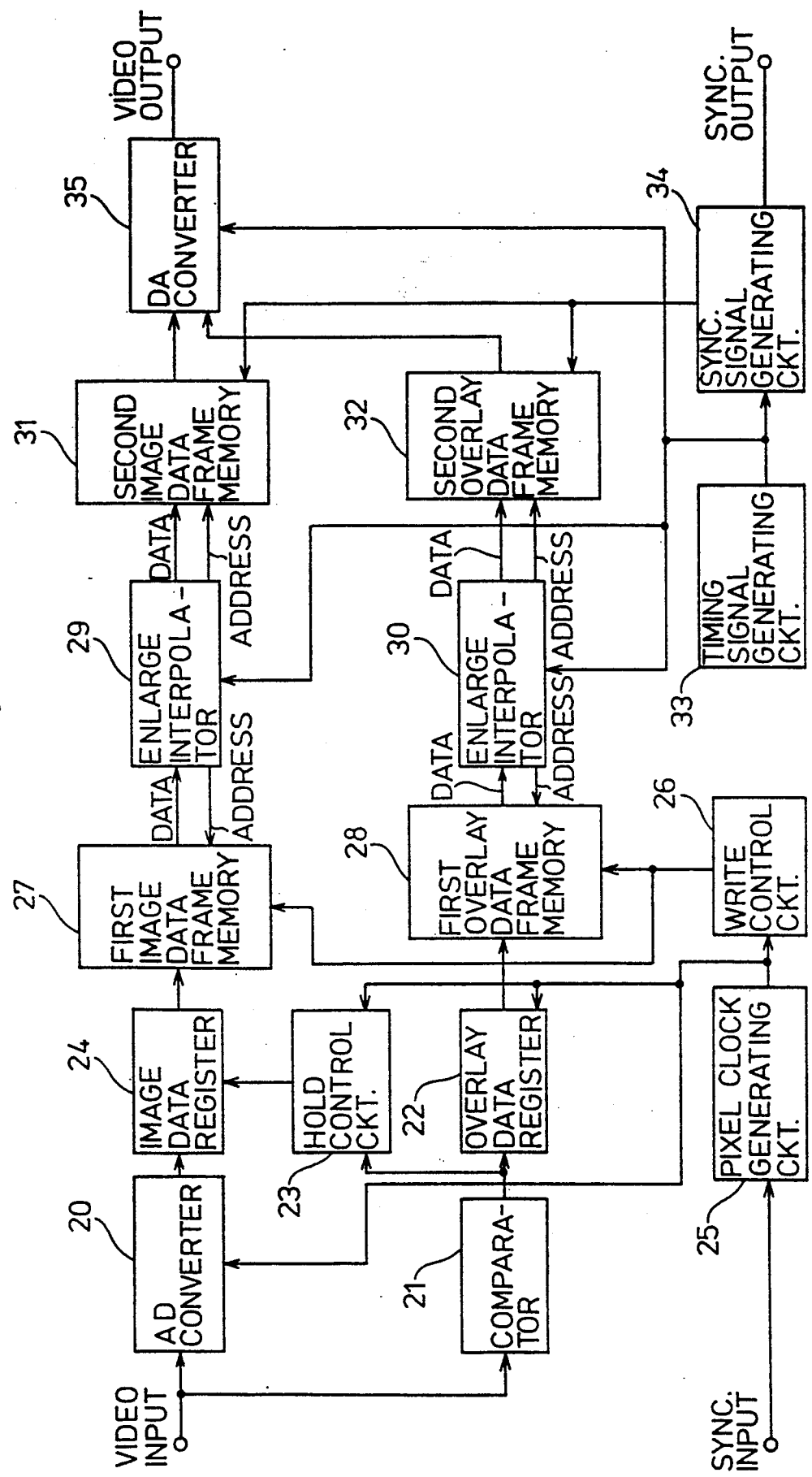
FIG. 1 is a block diagram showing an embodiment of the present invention.

An embodiment of the present invention will now be described in greater detail with reference to the drawings. In FIG. 1, 20 is an A-D converter for converting an input analog video signal into a digital signal, and 21 is a comparator for comparing the level of the input analog video signal with a threshold voltage internally set to take out only overlay data whose level exceeds the threshold voltage. This overlay data output is temporarily held in an overlay data register 22 and sent to an image data hold control circuit 23. (The term "circuit" is abbreviated to "CKT" in the drawing.) 24 is an image data register for temporarily holding the image data converted by the A-D converter 20 into the form of a digital signal, which is controlled by the image data hold control circuit 23 either to take in a new data output from the A-D converter 20 or to hold the last data. 25 is a pixel clock generating circuit for generating a pixel clock signal having a period corresponding to one pixel by multiplying a horizontal synchronizing signal included in an input composite synchronizing signal by the use of a built-in PLL circuit or the like. This pixel clock signal generated is sent to the overlay data register 22, the image data hold control circuit 23, and a write control circuit 26. This write control circuit 26 generates write address signals in synchronism with the pixel clock signal and applies them to a first image data frame memory 27 and a first overlay data frame memory 28, so that the output data of the image data register 24 and the output data of the overlay data register 22 are written in these memories. 29 is an enlarge interpolator which reads the image data out of the first image data frame memory 27 by sending a read address signal thereto, performs an enlarge interpolation processing, and writes the result in a second image data frame memory 31. 30 is another enlarge interpolator which reads the overlay data out of the first overlay data frame memory 28 by sending a read address signal thereto, performs an enlarge interpolation processing, and writes the result in a second overlay data frame memory 32. 33 is a timing signal generating circuit which generates a pixel clock signal compatible with the number of scanning lines increased and applies it to the two enlarge interpolators 29 and 30, a synchronizing signal generating circuit 34, and a D-A converter 35. This synchronizing signal generating circuit 34 generates vertical and horizontal synchronizing signals corresponding to the number of scanning lines increased in accordance with the pixel clock signal input to provide a new composite synchronizing signal, and also generates read address signals to be applied to the second image data frame memory 31 and the second overlay data frame memory 32. The D-A converter 35 combines the data read out of the two frame memories 31 and 32 into an output analog video signal.

The operation of the foregoing embodiment of the present invention will be described. The input analog video signal has a waveform corresponding to a variable-density image signal on which an overlay signal is superposed. FIG. 2 shows such an input analog video signal over one scanning line. As illustrated in FIG. 2, the input analog video signal is composed of a variable-density image signal 50 and an overlay signal 51 representing a figure of character, graphic symbol, cursor, etc. 52 is a composite synchronizing signal. 53 is a blanking level or reference potential whose intensity is zero in level. $V_T$ is a threshold voltage for separation of the overlay signal 51 from the variable-density image signal 50, which is set to be higher than a potential $V_A$ corresponding to the highest intensity level of the variable-density image signal 50, but lower than a potential $V_L$ corresponding to the intensity level of the overlay signal 51. The input analog video signal is applied to both the A-D converter 20 and the comparator 21. The analog video signal applied to the comparator 21 is compared with the threshold voltage $V_T$. Only a signal whose potential is larger than the threshold voltage $V_T$ is held in the overlay data register 22 as overlay data and also applied to the image data hold control circuit 23. The write operation into the overlay data register 22 is performed in synchronism with the pixel clock signal from the pixel clock generating circuit 25.

The analog video signal applied to the A-D converter 20 is converted into a digital signal which is written in the image data register 24 in synchronism with the pixel clock signal from the image data hold control circuit 23. However, the supply of the pixel clock signal from the image data hold control circuit 23 to the image data register 24 is stopped while the overlay data is being applied to the image data hold control circuit 23, i.e. while the output of the comparator 21 is "1"; consequently, the write operation of the video signal into the image data register 24 is inhibited during the foregoing interval; thus, during the same interval the image data register 24 keeps the data immediately before the output of the comparator 21 becomes "1". Such circumstances are illustrated in FIG. 3. In FIG. 3, 54 is the "1" output of the comparator 21 having taken out a signal whose potential exceeds the threshold voltage $V_T$, which is the "overlay data". 55 is the variable-density image data from which the overlay signal 51 was removed. Although the variable-density image data 55 is actually handled in the form of a digital signal, it is illustrated in analog waveform for convenience of understanding. In the variable-density image data 55, during intervals t1, t2 and t3 corresponding to the signal portions where the overlay signal 51 was present, the variable-density image data of points A, B and C immediately before the output of the comparator 21 becomes "1" are preserved, respectively. In this way, the input video signal is separated into the overlay data 54 and the variable-density image data 55 which are written in the overlay data register 22 and the image data register 24, respectively. The write control circuit 26 generates the write address signals pertaining to the first image data frame memory 27 and the first overlay data frame memory 28 on the basis of the pixel clock signal from the pixel clock generating circuit 25, so that the data from the image data register 24 and from the overlay data register 22 are written in these memories. When the data of one frame has been written in the first image data frame memory 27 and in the first overlay data frame memory 28, the enlarge interpolator 29 and the enlarge interpolator 30 read the data out of the first image data frame memory 27 and out of the first overlay data frame memory 28, perform the respective enlarge interpolation processings, and write the resultant data in the second image data frame memory 31 and in the second overlay data frame memory 32, respectively. At this time, the timing generating circuit 33 generates a pixel clock signal compatible with the number of scanning lines increased and applies it to the enlarge interpolators 29 and 30, synchronizing signal generating circuit 34, and D-A converter 35. The enlarge interpolators 29 and 30 generate the write address signals in synchronism with the pixel clock signal, and write the variable-density image data and the overlay data both interpolated in the second image data frame memory 31 and in the second overlay data frame memory 32, respectively; as a result, an enlarged image is formed by the resultant variable-density data and overlay data.

Figures 4A, 4B, 5A, 5B:
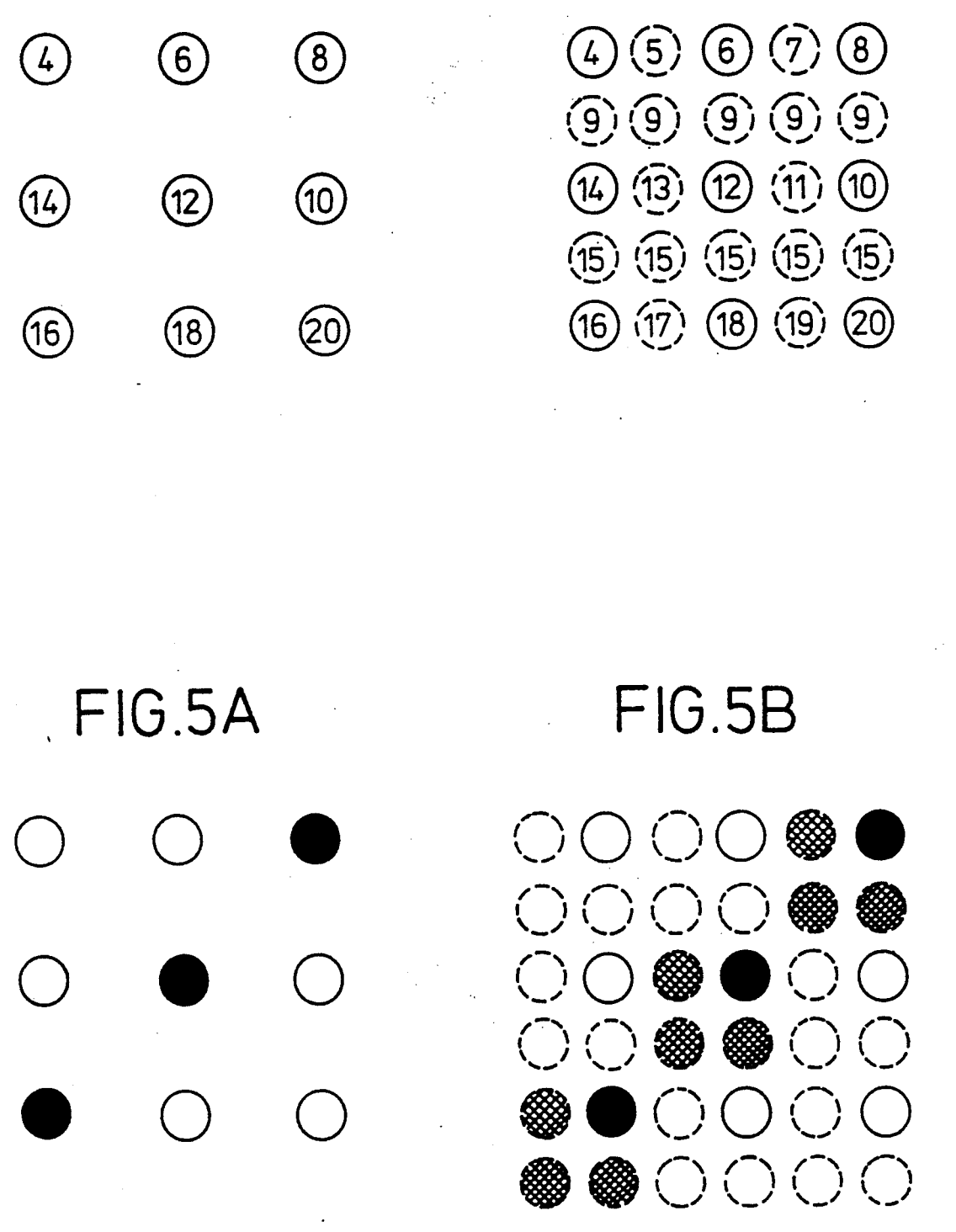

The interpolation processing is performed as illustrated in FIGS. 4A and 4B with respect to the variable-density image data, and as illustrated in FIGS. 5A and 5B with respect to the overlay data. FIG. 4A shows a portion of one frame, made up of 512×512 pixels, for example, of the input video signal, in which a circle represents a pixel and a number inside the circle indicates the intensity level of each pixel. FIG. 4B shows the same portion as that shown in FIG. 4A, that is enlarge-interpolated to a frame made up of 1024×1024 pixels, in which a solid circle corresponds to the original pixel, a dotted circle represents an interpolation pixel generated by the enlarge interpolation processing, and a number inside the circle indicates the intensity level of each pixel. The intensity level of the interpolation pixel corresponds to the mean value in intensity of the original pixels adjacent to the interpolation pixel. Such interpolation is generally performed on the basis of a linear interpolation method. Of course, any analog interpolation method can be used. As will be appreciated, since the interpolation processing is performed on the variable-density image data whose overlay data is removed and replaced with a variable-density image data portion immediately before the begining of the overlay data, the interpolation data generated cannot be influenced by the overlay data. FIG. 5A shows an overlay display portion of one frame made up of 512×512 pixels, in which a black circle represents a pixel of high intensity, and a white circle represents a pixel of low (or zero) intensity. FIG. 5B shows the same portion as that shown in FIG. 5A, that is enlarge-interpolated to a frame made up of 1024×1024 pixels, in which a black circle corresponds to the original pixel, and a cross-hatching circle represents an interpolation pixel generated. This interpolation pixel has the same high intensity as that of the original pixel and is arranged in the same way as the original pixel arrangement. Such interpolation is generally performed on the basis of a two-stateimage interpolation method. Here, since the interpolation processing is performed on the two-state image data in which no variable-density image data is included, the image data generated through interpolation cannot be influenced by the variable-density image data. That is, the surroundings of the two-state image cannot grow dim in contrast to the prior art.

The synchronizing signal generating circuit 34 provides the vertical synchronizing signal and horizontal synchronizing signal for displaying on the CRT in the form of the composite synchronizing signal, and applies the read address signals to the second image data frame memory 31 and the second overlay data frame memory 32, so that the enlarged image data from these memories are applied to the D-A converter 35. The D-A converter 35 combines the variable-density image data and the overlay data and converts the result into an analog signal in synchronism with the pixel clock signal from the timing generating circuit 33 to provide an output video signal compatible with the new number of scanning lines.

The present invention should not be limited to the foregoing embodiment. That is, although the embodiment enlarges the image by a factor of two, this enlargement factor can be set to any integral number using the same method as used in the embodiment. Although the embodiment is described as using the independent image data frame memories for before and after interpolation and the independent overlay data frame memories for before and after interpolation, these memories may be replaced with a common memory unit which will be put in use by adopting any desired address mapping system. The image data register 24 may be built in the A-D converter 20. Since the overlay data register 22 is used to make the write timing of the overlay data into the first overlay data frame memory 28 accord with the write timing of the variable-density image data into the first image data frame memory 27, it may be omitted if any adequate timing control system is adopted. The CRT serving as a display unit for an enlarged image may be replaced with a laser printer, thermal printer, etc.

While the preferred embodiment has been described, various modifications and changes may occur to those skilled in the art without departing from the spirit and scope of the invention as defined by the appended claims.

What is claimed is:

1. A video signal processing apparatus for converting an input analog video signal, whose number of scanning lines is given, including a variable-density image signal and a two-state image signal overlaid on the variable-density image signal into an output analog video signal whose number of scanning lines is larger than that of the input analog video signal, comprising variable-density image signal extracting means for extracting the variable-density image signal from the input analog video signal, a portion of the extracted variable-density image signal corresponding to the two-state image signal being replaced with a variable-density image signal portion immediately before the beginning of the two-state image signal, two-state image signal extracting means for extracting the two-state image signal from the input analog video signal, first memory means for storing the output signal, corresponding to at least one frame, of the variable-density image signal extracting means and the output signal, corresponding to at least one frame, of the two-state image signal extracting means in the form of digital image data, variable-density image data enlarge-interpolating means for performing an enlarge interpolation processing on the variable-density image data stored in the first memory means to generate variable-density image data whose number of scanning lines is larger than the corresponding stored image, two-state image data enlarge-interpolating means for performing an enlarge interpolation processing on the two-state image data stored in the first memory means to generate two-state image data whose number of scanning lines is larger than the corresponding stored image, second memory means for storing the output data, corresponding to at least one frame, of the variable-density image data enlarge-interpolating means and the output data, corresponding to at least one frame, of the two-state image data enlarge-interpolating means, and analog video data output means for concurrently reading out the variable-density image data and the two-state image data stored in the second memory means and combining these read-out data to provide the output analog video signal.

2. A video signal processing apparatus according to claim 1, wherein the two-state image signal extracting means is composed of a comparator for comparing the input analog video signal with a given threshold value and an overlay data register for holding the output signal of the comparator in the form of two-state data.

3. A video signal processing apparatus according to claim 2, wherein the variable-density image signal extracting means is composed of an A-D converter for converting the input analog video signal into a digital signal, an image data register for holding the output data of the A-D converter, and an image data hold control circuit for inhibiting the data holding of the image data register when the two-state output data of the comparator is "1".

4. A video signal processing apparatus according to claim 1, wherein the variable-density image data enlarge-interpolating means is a linear interpolator.

* * * * *